(12) United States Patent
Park et al.

(10) Patent No.: US 10,069,753 B2
(45) Date of Patent: Sep. 4, 2018

(54) RELATIONSHIP-BASED RESOURCE-CONTENTION ANALYSIS SYSTEM AND METHOD

(71) Applicant: Cloud Physics, Inc., Mountain View, CA (US)

(72) Inventors: Nohhyun Park, San Jose, CA (US); Carl A. Waldspurger, Palo Alto, CA (US)

(73) Assignee: Cloud Physics, Inc., Mountain View, CA (US)

(*) Notice: Subject to any disclaimer, the term of this patent is extended or adjusted under 35 U.S.C. 154(b) by 142 days.

(21) Appl. No.: 14/659,615

(22) Filed: Mar. 17, 2015

(65) Prior Publication Data

US 2015/0263986 A1    Sep. 17, 2015

Related U.S. Application Data

(60) Provisional application No. 61/953,938, filed on Mar. 17, 2014.

(51) Int. Cl.
*G06F 15/173* (2006.01)
*H04L 12/911* (2013.01)
(Continued)

(52) U.S. Cl.
CPC ............ *H04L 47/781* (2013.01); *G06F 3/067* (2013.01); *G06F 3/0614* (2013.01); *G06F 3/0631* (2013.01); *H04L 41/0896* (2013.01); *H04L 41/142* (2013.01); *H04L 67/1097* (2013.01); *H04L 67/42* (2013.01); *H04L 41/5096* (2013.01); *H04L 43/0852* (2013.01); *H04L 43/0888* (2013.01)

(58) Field of Classification Search
None
See application file for complete search history.

(56) References Cited

U.S. PATENT DOCUMENTS 8,175,863 B1 * 5/2012 Ostermeyer ........ G06F 17/5009
                                                  703/13
8,396,807 B1 * 3/2013 Yemini ................. G06Q 10/06
                                                  705/400

(Continued)

*Primary Examiner* — Kenny S Lin
(74) *Attorney, Agent, or Firm* — Jeffrey Pearce

(57) ABSTRACT

Contention for a resource in a computer system resource is managed by measuring a resource performance metric and, for each of a selected plurality of clients (for example, virtual machines), a client performance metric. For each of the selected clients, a relationship measure, such as correlation, is determined as a function of the resource performance metric and the respective client performance metric. A degree of resource contention effect is determined for each of the selected clients as a function of the respective relationship measure, and a resource-related action is taken according to the respective relationship measures. Clients may include virtualized components contending for storage. Example metrics include functions of I/O operation counts, latency or throughput measurements, pending I/O request counts, I/O throughput relative to I/O latency, a degree of change of the respective clients' I/O behavior, etc. Possible actions include changing resource allocations, access throttling, and reporting, etc.

54 Claims, 2 Drawing Sheets

(51) Int. Cl.
*H04L 29/08* (2006.01)
*H04L 12/24* (2006.01)
*H04L 29/06* (2006.01)
*G06F 3/06* (2006.01)
*H04L 12/26* (2006.01)

(56) References Cited

U.S. PATENT DOCUMENTS

| | | | |
|---|---|---|---|
| 2012/0054331 A1* | 3/2012 | Dagan | G06F 11/0712 709/224 |
| 2014/0068053 A1* | 3/2014 | Ravi | G06F 9/5072 709/224 |
| 2014/0280884 A1* | 9/2014 | Searle | H04L 43/0864 709/224 |
| 2014/0351394 A1* | 11/2014 | Elisha | H04L 41/0806 709/222 |
| 2015/0199252 A1* | 7/2015 | Ilangovan | G06F 11/3409 702/186 |
| 2015/0254000 A1* | 9/2015 | Sivathanu | G06F 12/0868 711/103 |

* cited by examiner

RELATIONSHIP-BASED RESOURCE-CONTENTION ANALYSIS SYSTEM AND METHOD

CROSS-REFERENCE TO RELATED APPLICATIONS

This application claims priority of U.S. Provisional Patent Application No. 61/953,938, filed 17 Mar. 2014.

BACKGROUND

In many computing environments, application workloads access shared storage systems, such as block storage provided by a SAN-based storage array, or file storage provided by a NAS-based file server. For example, virtualized datacenters typically consolidate many virtual disks, associated with heterogeneous virtual machine (VM) workloads, onto a small number of shared, networked storage servers. See, for example, Ajay Gulati, Ganesha Shanmuganathan, Irfan Ahmad, Carl A. Waldspurger, and Mustafa Uysal, "Pesto: Online Storage Performance Management in Virtualized Datacenters", Proceedings of the Second ACM Symposium on Cloud Computing (SOCC '11), Cascais, Portugal, October 2011 ("PESTO"). Such consolidation helps reduce costs by utilizing storage devices more efficiently. By enabling virtual disks to be accessed remotely, a network-based storage system also facilitates live migration of VMs across hosts.

Unfortunately, storage clients commonly exhibit complex I/O behavior, with bursty I/O workloads and I/O locality patterns that may vary significantly over time. Virtualized environments can be especially complicated, with a diverse set of mixed workloads sharing a collection of heterogeneous storage devices. Since I/O performance is complex and dynamic, it is very challenging to identify and understand the causes of performance problems, such as contention for shared storage devices. This makes it extremely difficult for system administrators to provision, partition, and manage storage to meet application workload demands.

Ideally, what is desired is an automated method that can identify periods of storage contention, and which can analyze the interactions between client workloads during such periods. Contention analysis can help inform both system administrators and automated storage management tools, enabling them to optimize workload placement and to improve other storage management decisions.

DETAILED DESCRIPTION

Embodiments of the invention comprise both software components that interact with parts of a computer system, as well as a method of operation that defines this interaction to provide information intended to improve management of a resource such as storage. First, the various main parts of such a computer system are discussed. Then, the method of operation is detailed.

Figure 1:
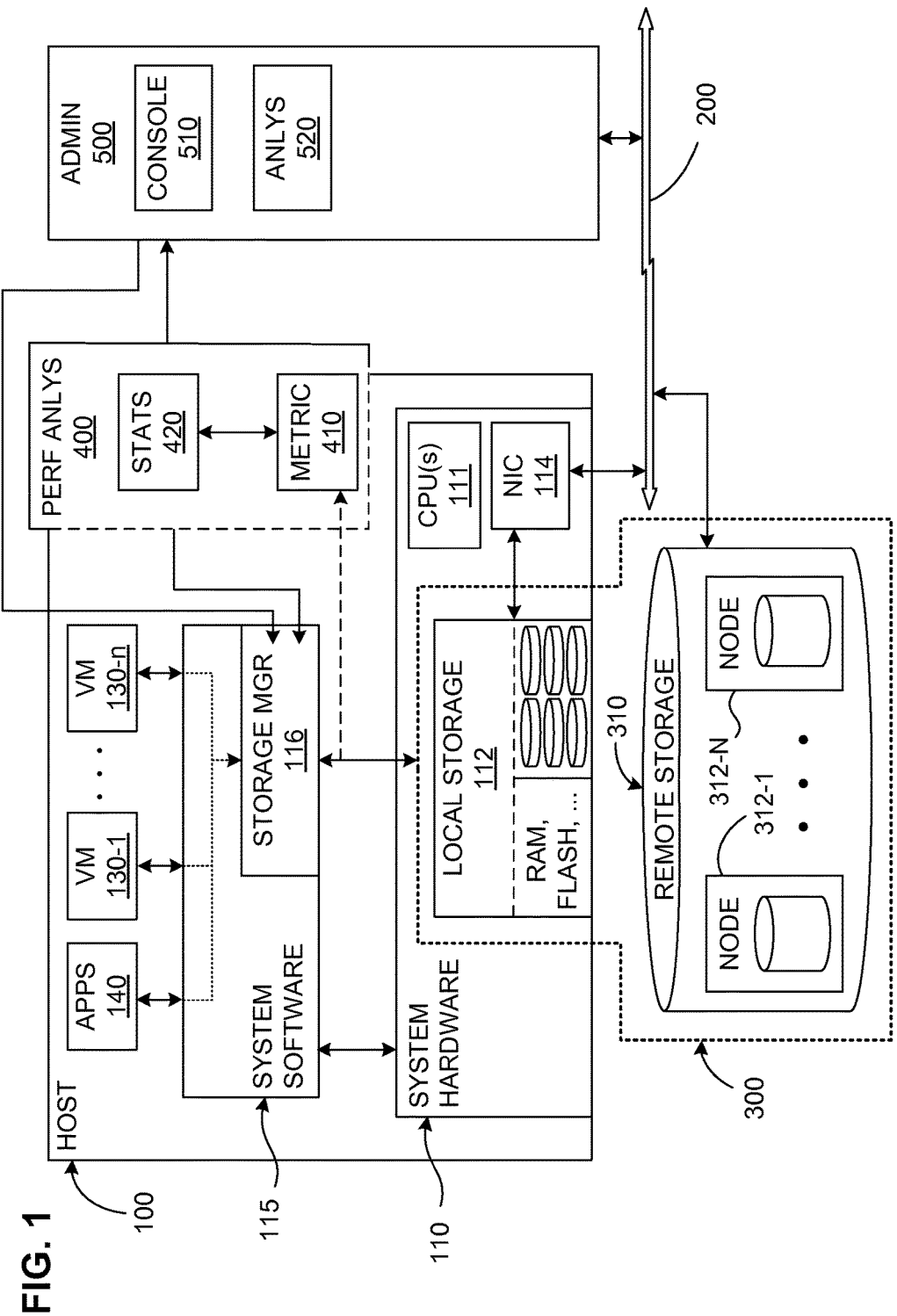
FIG. 1 illustrates the main hardware and software components in a system that incorporates the novel storage metrics and analysis provided by embodiments of the invention.

FIG. 1 illustrates the main components of a basic embodiment of the invention. Each of one or more host platforms 100 (only one is shown, for simplicity), such as servers, includes system hardware 110, including one or more processors (CPU's) 111 and, as needed, network interface circuitry 114 to allow the host to communicate over a network 200 with remote systems. Other conventional system hardware components such as, for example, interfaces with user or other I/O devices, including such things as a display, keyboard/mouse/etc., may be included as desired but are not shown or described further here for the sake of succinctness.

The system hardware also includes a storage system 300. In this description, except where a distinction is relevant, the term "storage" is used merely by way of succinctness for any, or any combination of, persistent or non-persistent, volatile and/or non-volatile devices, including those normally categorized as "memory", that are used to store data and/or code, persistently and/or non-persistently, and thus form a resource for which different client processes may contend. The line between what is a "storage device" and "memory" is no longer as bright as it once was, and the embodiments described here do not presuppose such a distinction. Accordingly, merely for the sake of simplicity, the term "storage", unless otherwise indicated, is used here to include, without limitation, disks (implemented using any technology, including both mechanical and solid-state), RAM, flash, Phase-Change Memory (PCM), NVM, etc.

As FIG. 1 illustrates, the storage system 300 (indicated generally and collectively by the dotted line 300) available for use under the control of the system software will typically include local storage 112, but the host (that is, any host 100) could also be configured to access, via the network(s), a remote storage pool 310 as well. The remote storage pool 310 may be of any type or configuration, from a single disk to a mixed storage technology system spread over multiple servers and locations in the "cloud", SAN-based storage arrays, NAS-based file servers, etc. In FIG. 1, the remote storage pool 310 shows N nodes, that is, storage entities 312-1, . . . , 312-N. Each such entity will include suitable, known, storage or device controllers (not shown, for simplicity) as needed. The concepts of "local" and "remote" storage may also include persistent and/or non-persistent memory/storage within other devices such as a video card, and peripheral devices attached to the host or otherwise accessible for data transfer via the network 200. In short, the "storage system 300" may have a wide variety of configurations that may benefit from embodiments of the invention, depending on the particular needs of system designers.

Relevant to embodiments of this invention (at least those in which the shared and possibly contended resource of interest is storage) is therefore that the storage system 300, either internal (local) 112 to the (or each) host, or in remote storage 310, or both, is able to receive storage requests from system software 115 to read or write data, and includes suitable, conventional control circuitry and other mechanisms to enable it to process such requests by communicating with internal storage devices, remote storage devices, or both.

In systems that require network access, for example to perform I/O operations with the remote storage pool 310, any number of actual networks may be included as "the" network 200, along with any necessary switching or other communications devices if data needs to pass between different networks. The networks may be internal, inter-host, the Internet, and/or any other analogous communications channel capable of data transfer, including, but not limited to, LAN and SAN networks. The only requirement is that, whatever network(s) is/are used, the host 100 should be able to transmit and receive data to and from whichever storage devices, internal and/or external, it needs to access. Note that, even in systems in which the clients to be analyzed by this invention use remote storage, they will typically also use local disks as well; for example, some virtualized systems use local storage for some purposes such as boot images, swapping, and transient local state. Local SSD/flash devices are, moreover, also commonly used as a cache of remote storage.

The host will also include conventional system software 115, such as, depending on the implementation, an operating system (OS), device drivers, etc. User-level applications 140 then run in the known manner on the system software. As FIG. 1 illustrates, virtual machines 130-1, . . . , 130-n may also be running as guests in the host. In such a case (which is assumed below by way of example), the system software will include, or itself be, or will be co-resident with, some form of hypervisor or similar interface layer between the system hardware 110 and the VMs.

As is well known, a VM is a software abstraction of an actual physical computer system. Accordingly, one or more virtual disks will be associated with each VM. Of course, data is stored in actual devices, so the system software (such as the hypervisor, virtual machine monitor, etc.) maintains at least one mapping from virtual to physical addresses, in particular, in the context of memory management. Since such memory and disk mappings occur even in non-virtualized systems, virtualized systems will generally include at least two levels of address redirection, from a guest virtual addresses to guest physical addresses (which are also virtualized constructs), and then from the guest physical addresses to actual machine addresses in the physical system. The various embodiments of the invention described here are not dependent on any particular virtualization architecture, whether for the VMs, the hypervisor(s) or any other virtualization layers. Indeed, the invention does not presuppose VMs at all. Nonetheless, a system running VMs is discussed below, by way of example and without limitation, to illustrate the operation of one implementation of embodiments of the invention.

FIG. 1 also shows a performance analysis tool 400. This system/component is shown partially with a dashed line in the "corner" to indicate that it may be a separate, external system, for example, provided as an independent analysis tool, or it could be incorporated into the concept of the host itself, for example, in implementations that are to include more continuous, on-going performance optimization. The performance analysis tool may even be a remote system, which accesses the host via a network, although, if the invention is to be used for real-time resource management, the resulting network latency will then have to be taken into account in the some of the metric computations described below. If the performance analysis tool is configured to be separate from the host 100, then it will include at least one processor, non-volatile and/or volatile storage and memory components, and other conventional components, in which case the tool will comprise computer-executable code that causes its processor(s) to perform the method steps described herein. As an alternative, the analysis tool could be configured to support off-line evaluation and management of resource usage. For example, usage data could be collected using known methods at customer sites, then streamed or otherwise transferred to a different site, including to a cloud-based backend (not on customer premises), which can then provide a web-based interface for the customer to explore periods of contention.

This performance analysis tool comprises computer-executable code that is stored either in the storage system 300 and causes the processor(s) 111 to perform the various operations described below, or it will be stored in similar storage components in whichever system is to perform the analysis of resource usage using the measurements described below. It may be loaded into the host initially, or provided for installation afterwards as a computer program product on any known non-transitory medium, both in "hard", physical form, or through downloading from such a medium. The component 400 could also be incorporated into the system software 115, either as an integral part of it, or as an extension, or it may be a software component that itself works essentially at user or administrator level, albeit one that is able to sense certain aspects of storage I/O operations described below. Two parts of the performance analysis component 400 are a metric sub-component 410, and a statistics sub-component 420.

In general, embodiments of this invention leverage a key observation: As the contention among multiple clients for a shared storage system increases, performance metrics associated with its individual storage clients (such as the VMs or applications, or even system-level software) will become increasingly correlated with aggregate performance metrics associated with the contended system. Conversely, if the performance of a client is not correlated with the aggregate performance of the storage system serving its data, then contention is unlikely to be the underlying reason for client slowdown. In such uncorrelated cases, performance degradation is more likely due to the client's own intrinsic behavior and storage request mix, or the result of internal storage system behavior, rather than competition among clients for scarce aggregate resources. The inventors have observed experimentally that, in uncorrelated cases, I/O latency, for example, is driven primarily by the workload whereas a high correlation suggests that the latency is being determined, or at least determined more, by the shared datastore device/resource. Other causes of latency and thereby contention might include external system performance degradation, such as caused by implicit workloads or intermittent failures of system components, network congestion, etc.

Correlations between individual client metrics and aggregate server metrics may be computed using many different well-known statistical techniques, such as the Pearson correlation coefficient, commonly denoted by r. Such correlations may be calculated for various performance metrics, including measures of storage request latency and throughput over a given time period. As one example, the Pearson correlation coefficient may be computed between pairs of a client's average disk read request latency, and a storage server's average disk read request latency (aggregated across all clients), over a series of n contiguous m-second intervals. For example, n=30 contiguous m=20-second intervals would represent a ten-minute evaluation period. In this case, a simple correlation threshold, such as r>0.6, may be used to classify a client as experiencing contention over the time period.

While Pearson's r is a measure of linear correlation, other well-known statistical correlation techniques may be applied when the relationship is known or observed not to be linear. For example, raw data points can be transformed, by applying a mathematical function to each of the individual client metrics and/or the aggregate server metrics, such as taking the log, square-root, or reciprocal of each data point, before computing a linear correlation over the transformed data. This effectively changes the measurement scale of the variables so that a linear method, such as the Pearson correlation coefficient, can produce a correlation for a non-linear relationship. Yet another approach is to use a non-parametric measure of statistical dependence, such as Spearman's rank correlation coefficient, commonly denoted by rho. Different correlation notions and metrics are well-known in the field of mathematical statistics and, if desired, system designers may choose any such metric in light of normal experimental techniques applied to the circumstances of any given implementation of this invention.

Thus, for a given storage system, let ρ represent the chosen measure of relationship, such as correlation, such that $\rho_i=(c_i, S)$, where $c_i$ is the chosen metric for client i and S is the chosen aggregate storage system metric. One specific example of such as relationship is discussed below.

In FIG. 1, sub-component 410 is shown to represent the computer-executable code that senses the performance-related signal (such as I/O latency) and determines a corresponding value; component 420 then computes the chosen relationship measure, such as the various correlation values.

Classification accuracy may be improved by additionally employing other criteria as further evidence of contention. For example, a client may be considered to be impacted by contention only when its contention metric, such as average or peak disk read latency, also exceeds some threshold—either an absolute value, such as 10 milliseconds, or a relative value, such as 50% higher than some longer-term average. Other thresholds and filters may be applied in different implementations. For example, filters may leverage metrics such as peak or average throughput, or statistical measures such as the standard deviation or coefficient of variation.

Filters may also be used in situations where there is a plurality-to-plurality correspondence between clients and contended resources. Instead of having a plurality of clients contending for a single resource, such as a datastore, with corresponding correlations being used as the relationship metric, there could be, as one example, a set of virtual disks (clients) whose disk blocks are striped (as in a RAID system) over a distributed set of many nodes, each of which would exhibit its own latency, or other metric. A multi-dimensional relationship metric $c_{ij}$, between virtual disk i and node j could then be computed over the storage requests sent by client i. For evaluation, $c_{ij}$ could then be filtered to leave only a subset of $c_{ij}$ so as, for example, to include traffic to only a single one of the storage nodes.

It is also not necessary to limit the relationship metric c to a correlation of like values, such as latency. Instead, in some circumstances, it might be of interest to correlate, for example, latency on the client side with a load metric on the resource side, such as the number of pending I/O requests in its queue to process, or some more complex or proprietary notion of bad.

After identifying contention for storage resources within a time period, some individual clients may be classified further as either culprits—typically, heavy I/O clients responsible for causing contention, or victims—typically, less intensive I/O clients whose performance is degraded significantly by culprits. Of course, to some extent, each client is both a culprit (inducing load that slows down other clients), and a victim (experiencing slowdown due to load induced by other clients). Nevertheless, the performance of active clients within a contended time period may be analyzed to assess their impact on the overall system. For example, in one classification, over a given time period, a client may be considered to be a culprit if it is using significantly more than its fair share (measured relative to an absolute or relative threshold) of throughput (total number of IOs, or total data transfer). Similarly, a client using significantly less than its fair share of overall throughput is considered to be a victim. Still another metric, possibly in addition to throughput, might be a measure of outstanding I/Os, that is, the number of I/O operations concurrently in flight from the client to the datastore.

Although the proposed invention is not limited to virtualized datacenters, the terminology commonly used in such systems is used here for convenience, without loss of generality, and by way of one particularly advantageous example of the use of the invention. In particular, the discussion below will refer to a shared storage location as a datastore, a standard term introduced by VMware, Inc., for a logical container used to store one or more virtual disks, along with other information such as metadata. A datastore typically corresponds to a Logical Unit Number (LUN) or a filesystem on a shared storage device. Each virtual disk file associated with a VM is placed on a datastore, which can be assumed here to be part of the storage system 300, which may, and often will, include the remote storage pool 310.

Performance-management systems collect and analyze data associated with clients accessing a shared storage system. Examples include the on-premise VMware vCenter Operations Management Suite (VMware vCOPS), available commercially from VMware, Inc., and the software-as-a-service (SaaS) storage analytics service available commercially from CloudPhysics, Inc. Such systems collect and process a variety of I/O performance metrics for both storage servers and their clients. Typical metrics include raw counts of I/O operations, such as reads and writes, I/O sizes, and latency and throughput values averaged over various time periods. For example, one such metric is the average latency of I/O reads processed over 20-second time window, measured for both individual virtual disks and the datastore that contains them. In FIG. 1, such a performance management system is represented by the component 400.

In one embodiment, a series of per-virtual-disk and datastore-level metrics is obtained and analyzed by computing one or more correlations. This may be done using a corresponding software module operating in conjunction with a chosen performance-management system. Let $V_0, V_1, \ldots, V_n$ denote time-series data consisting of a performance metric for a single virtual disk V. Similarly, let $D_0, D_1, \ldots, D_n$ denote the corresponding time-series data consisting of the same performance metric for the datastore D containing virtual disk V, such that $V_i$ and $D_i$ represent data obtained for the same time period. As mentioned above, the Pearson correlation coefficient, or other suitable relationship measure, denoted by r, may then be computed to determine the strength of the dependence between the performance of virtual disk V and the datastore D that contains it.

Such correlations may be computed for many different performance metrics, in order to identify and analyze various aspects of contention in storage systems. For example, when the performance metric is I/O latency, a high positive correlation coefficient (such as r>0.5) is a strong indicator of contention. In other words, the response time for processing requests from V depends mostly on the average performance of D, and much less on the actual timing and particular mix of I/O requests from V. More generally, the system could instead compute p-values to determine statistical significance and then use these p-values for filtering, for example, to focus only on the most significant correlations.

Of course, the notion of "contention" presupposes more than one client to want to use some shared resource. In the degenerate case of a datastore D that is not being shared, with only a single active virtual disk V, although V and D will be highly correlated, this would not be classified as contention. In other words, "contention" exists only among two or more concurrently-active clients.

As another example, consider a correlation coefficient computed using I/O throughput as the performance metric. Average throughput may then be measured in units such as the volume of data transferred (such as MB/sec), or the rate of I/O operations (such as IOPS). If the throughput for virtual disk V is correlated with the aggregate throughput for datastore D, this can be interpreted as evidence that V is degrading the performance of other virtual disks on the same datastore D. A high correlation means that I/O from V is timed in a "near-pessimal" (almost as bad as possible) manner that induces more load on datastore D, during the times when D is most heavily loaded.

In one implementation, I/O latency correlations are computed between a datastore and each of the n virtual disks that it contains. When strong latency correlations are found, indicating a contended time period, the impact of each virtual disk is analyzed to assess its contribution to the contention. The fraction of I/O pushed by each virtual disk over the contended time period may be computed, for example, as $f_{vdisk}=T_{vdisk}/T_{datastore}$, where throughput T may be measured in units such as MB/sec or IOPS. If $f_{vdisk}$ is greater than a chosen load threshold, such as a factor $\alpha$ ($\alpha \geq 1$) greater than an equal share $1/n$, ($f_{vdisk} > \alpha/n$), for example, then the virtual disk may be classified as a culprit—a heavy I/O client that is causing contention; if it is significantly smaller, such as a factor $\beta$ ($0 \leq \beta < 1$) less than the chosen load threshold), then the virtual disk may be classified as a victim—a light I/O client that is slowed down by culprits.

Note that, depending on $\alpha$ and $\beta$, there will be a range in which $f_{vdisk}$ indicates neither victim nor culprit status—this of course simply indicates that that virtual disk is operating within an acceptable or "normal" range, that is, it neither causes nor suffers too much from contention. It is not necessary for the acceptable range of load thresholds to be the same for all clients, that is, in this illustrative case, for all virtual disks. Thus, factors $\alpha$ and $\beta$ could vary per client. Some clients, for example, might be performing more important tasks, and could then be allowed to cause more contention than others, without causing any reallocation or being throttled. Its $\alpha$ value could then be set higher relative to others. Similarly, clients that are more tolerant of delay could have their $\beta$ values set lower. One alternative to this, described below, accomplishes similar prioritization by scaling of $f_{vdisk}$ itself.

Note that the client-resource relationship is not necessarily plurality-to-one, but could also be plurality-to-plurality. For example, portions of a single virtual disk may be spread across multiple datastores, tiers, or caches, RAID nodes, etc. For example, $V_i$ might represent only a portion of a virtual disk, for example, a subset containing only certain blocks, extents, or data regions.

In general, a sequential workload should typically display a higher throughput than a random workload. In these cases, it would be possible to keep track of a workload's achievable throughput per unit latency, such as average $IO/s^2$, $MB/s^2$ or $KB/s^2$, etc. If the degree of contention has significantly increased the latency or decreased throughput of a given client, then a large drop in $IO/s^2$ (or similar metric) should be observed, which then may identify the respective client as a victim. If a client is participating in the contention without significant loss in $IO/s^2$, however, then it is probable that it contributes significantly to the cause without correspondingly suffering the performance degradation, which may identify it as a culprit. In other words, not only the current performance metric (such as latency, throughput, etc.) may be relevant and trigger some action such as an adjustment of the resource allocation, but also the change (trend) in the performance metric may be evaluated and used.

Note that the unit $IO/s^2$ (or $MB/s^2$ or $KB/s^2$, etc.) indicates, roughly, a change metric, that is, how much more/less difficult it is becoming for a client to complete the corresponding IO operation. In this case, the denominator isn't simply raw time, but rather relates to average observed latency. In other words, this metric indicates an amount of work needed to push an IO operation, with an assumption that there exists an at least approximately linear relationship between throughput and latency.

The identification of contended periods, and the classification of virtual disks as culprits or victims, can be used to inform either system-level or higher-level resource-management policies and actions, or both. When the performance analysis tool so indicates, action may be taken either by the tool 400 itself (such as sending an alert or report to an administrator), by the administrator (such as, for example, manual changes in resource management), or by the storage manager 116 (for example, as part of its normal resource-management tasks), FIG. 1 thus shows the performance-management system communicating results back to the storage manager 116, as well as to an administrator system 500. The administrator system 500 may be separate from the host, as illustrated in FIG. 1, or it could be made part of the overall host itself; moreover, the system 500 could be implemented to incorporate the performance analysis tool 400.

For example, I/O requests from a culprit might be actively throttled to reduce its impact on victims, using a technique such as PARDA, which is described in Ajay Gulati, et al., "PARDA: Proportional Allocation of Resources for Distributed Storage Access", Proceedings of the Seventh Conference on File and Storage Technologies (FAST '09), San Francisco, Calif., February 2009. Such techniques may also take into account the importance or criticality of particular clients or virtual disks, for example, by specifying per-client weights or quality-of-service goals. As another example, a resource manager may migrate or replicate virtual disks across different storage devices or servers, in order to reduce contention. Existing storage resource management systems, such as PESTO and the commercially-available VMware Storage DRS (SDRS) product, would benefit from the correlation-based contention analysis in this disclosure.

An alternative implementation may give more weight to I/O throughput from a virtual disk that is actually correlated with aggregate datastore throughput, since such I/O induces more load on the datastore when it is most heavily loaded. As one example, $f_{vdisk}$ can be scaled by the correlation coefficient $r_{vdisk}$, before classifying virtual disks as culprits or victims.

An interactive analysis tool 520, which may be included, for example, in the administrative system 500, may choose to sort virtual disks by $r_{vdisk}$, $f_{vdisk}$, $f_{vdisk} \times r_{vdisk}$, or similar derived values, for a rank-ordered presentation of virtual disks that are most responsible for contention. The analysis tool 520 could also be configured, for example, to explore the causes and effects of periods of contention and take suitable mitigating measures.

Note that it is not necessary to use only single metrics. Rather, depending on analysis choices, the system could determine a combination of metrics, for example, of both latency and throughput. For example, the correlation coefficient $r_{vdisk}$ could be computed with respect to latency or throughput; similarly, the fraction $f_{vdisk}$ could be computed using either latency or throughput. Note, moreover, that if client latencies are correlated, but their throughputs are not correlated, then this may also be used as an indication that latency is being driven by the resource/device, and thus the datastore is contended.

When available, fine-grained performance metrics, where each metric is computed over a relatively short time interval, are generally preferred to more coarse-grained metrics, computed over relatively long intervals. For example, correlations over metrics with sub-second granularity provide more accurate information about interference between I/O requests that are processed concurrently by a storage device, compared to correlations over metrics with multi-minute granularity. Of course, fine-grained metrics are usually more costly to collect, store, and process, so different implementations may arrive at different tradeoffs between accuracy and overhead, tailored to particular use cases. In addition, when computing very fine-grained correlations, it may be advantageous to account for small time lags between I/O operations that cause contention by consuming storage-system resources, and the result of such contention on subsequent I/O requests. Such fine-grained analysis must also ensure that monitored events can be aligned properly on a consistent timeline, or, alternatively, compensate for possible misalignments.

Correlation information may also be combined with additional criteria for identifying and analyzing contention. For identifying contention, it is often advantageous to require not only a strong I/O latency correlation between virtual disks and their associated datastore, but also that the virtual disk I/O throughput is above some minimum threshold. For analyzing contention, and classifying virtual disks as culprits or victims, similar thresholds may be applied to performance metrics such as latency, throughput, IOPS, $IO/s^2$, and the number of outstanding IOs (OIO). Similarly, these metrics may be computed over various subsets of I/O requests, such as reads, writes, or various groupings by I/O size.

In some implementations, simple static thresholds may be sufficient. Other implementations may require more robust dynamic thresholds, in order to identify values that are significantly larger or smaller than normal in a given environment. For example, a simple dynamic latency threshold may be specified as $1.25 \times L_{avg}$, where $L_{avg}$ is the average latency measured for a given datastore. Well-known statistical measures, such as the standard deviation or coefficient of variation, may also be used to construct more sophisticated relative thresholds. As one example, a dynamic latency threshold may be specified as $L_{avg}+(1.5 \times L_{sd})$, where $L_{sd}$ is the standard deviation of the latencies measured for a given datastore. Such a method will yield more robust thresholds for different datastores that employ diverse underlying storage devices, such as 15 milliseconds for traditional rotating media and 2 milliseconds for solid-state disks (SSDs).

Yet another way to determine thresholds would be to use an average from known, uncontended periods, rather than an average over all periods as already mentioned. Yet another approach is to incorporate information about "normal" or "expected" latencies or other performance metrics, when available, that may be specified externally, for example, by administrators.

Still another alternative would be to compare a metric such as, for example, throughput/latency (or latency/throughput) for each client across both contended period and non-contended periods. In other words, when contention is detected, the system may examine the change in throughput relative to the non-contended period, for example, by keeping two histograms per client, corresponding to contended and non-contended periods. The ranking of culprits and victims could then be based in part on how much degradation the client suffers between these periods.

For both correlation-based analysis and threshold-based filtering, different implementations of the invention may use data spanning time periods of varying lengths. For example, one implementation may look narrowly at contention only within individual 15-minute time periods, while another may consider contention over much longer time periods, such as an entire day or week. Yet another option is to analyze contention over a hierarchy of time scales, computing coarse-grained correlations over long periods, as well as fine-grained correlations over shorter intervals within each long period.

Identifying contention at different time scales is useful for informing higher-level resource-management policies that may choose to perform both fine-grained and coarse-grained actions in response to the relationship metric results. For example, client I/O may be throttled immediately, at least portions of a virtual disk may be migrated to a faster tier of storage (such as SSD) or a different host, at a time scale of seconds to minutes, and entire virtual disks may be migrated or replicated between different storage servers at a time scale of minutes to hours. As another example, coarse-grained correlation information can also be used to identify client workloads that are naturally dependent or correlated, in order to reduce the probability of erroneously classifying such inter-workload correlations as contention for scarce storage server resources over shorter time periods.

Figure 2:
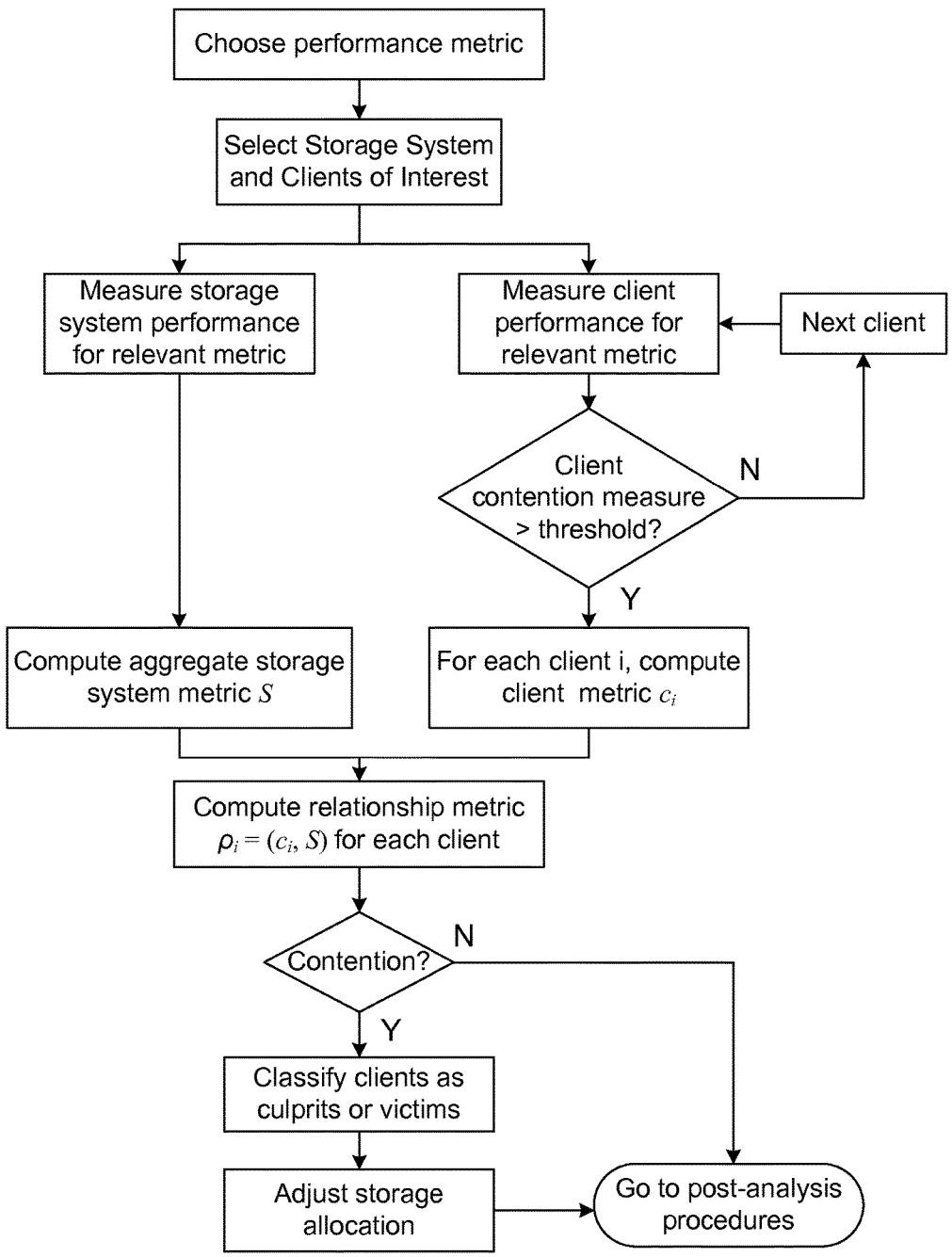
FIG. 2 is a flowchart showing the main steps followed by the contention-analysis and allocation system.

Depending on the needs and wishes of system designers, some actions that might be taken after completion of the contention analysis could actively affect the clients' interactions with the contended resource, such as changing allocations of the resource, for example, by throttling some client(s), terminating some of the processes making demands on the resource, etc. This could be implemented to happen automatically, for example, through the storage manager 116 or administrative system 500. Other actions might include alerting, reporting and displaying of the results, for example, via a console 510 in the administrative system 500), FIG. 2 is a flowchart showing the main steps followed by the contention-analysis system in the context of storage system metrics. Merely by way of example, the action that FIG. 2 shows as being the result of the system identifying unacceptable contention (with culprits and victims), trends in contention over time, etc, is an adjustment of storage allocation, followed by whatever other post-analysis procedures that are implemented, which may be as simple as "do nothing but observe" or "continue with execution unchanged."

In the discussion of contention above, relating to virtualized systems, the "clients" are virtual disks, which are contending for the physical storage resource. This is not the only form of client, however. As mentioned, any plurality of processes that need to share any form of limited resource could be clients, including entire VMs or other user- or even system-level processes.

There may, moreover, be "implicit" clients, that is, workloads accessing the resource (such as the datastore) for which there is no explicit performance data. For example, in a virtualized datacenter, the system might collect performance data for all virtual disks accessed by VMs, but there may also be some external non-VM/vdisk clients, such as an external non-virtualized host sharing the same storage system. Another type of "implicit client" might be an internal workload/operation local to the storage system associated with the datastore—such as a backup, garbage collection for Copy-On-Write (COW) filesystems, RAID reconstruction after a disk failure, or even network switch congestion. All of these could potentially affect performance seen by virtual disks or other clients, despite not being associated with any particular virtual disks.

Most of the embodiments of the invention described above provide information that can inform either automatic or administrator-controlled decisions of understanding of clients' behavior relative to each other and the contended resource. Some embodiments may be able to provide additional information as well. For example, assume the performance analysis system detects contention, but no detectable change in client throughput. One might then infer that the causes of latency and thereby the contention might include external system performance degradation, such as caused by implicit workloads or intermittent failures of system components, network congestion, etc.

Note that, in some implementations, the resource for which different clients contend may be something other than storage. For example, clients may in some cases contend for limited network bandwidth. In such cases, the procedures described here may be adapted for suitable analysis and allocation of such a resource as well.

We claim:

1. A method for managing a contended computer system resource comprising:
   measuring an aggregated resource performance metric;
   for each of a selected plurality of clients, determining a client performance metric;
   for each of the selected plurality of clients, determining a relationship measure as a function of the aggregated resource performance metric and the respective client performance metric;
   determining a degree of resource contention effect for each of the selected plurality of clients as a function of the respective relationship measure; and
   taking a resource-related action according to the respective relationship measures;
   in which:
   the relationship measure is a function of correlation between the aggregated resource performance metric and each respective client performance metric; and
   the resource-related action includes adjusting allocation of the contended resource among the clients.

2. The method of claim 1, in which the resource-related action includes throttling of access of selected ones of the clients to the contended resource.

3. The method of claim 1, in which the resource-related action includes generating a report for an administrator.

4. The method of claim 1, in which the contended resource is storage.

5. The method of claim 4, in which the storage includes both disk storage and memory.

6. The method of claim 4, in which the clients are running on a host system and the storage includes a local storage resource that is internal within the host system.

7. The method of claim 4, in which the clients are running on a host system and the storage includes a remote storage resource accessible by the host via a network.

8. The method of claim 1, in which the clients include virtual machines and the contended storage resource includes a plurality of virtual disks associated with the virtual machines.

9. The method of claim 1, in which the clients include virtual machines and the contended computer system resource includes a plurality of virtual disks.

10. The method of claim 1, in which the clients include user-level, host-based applications and the contended computer system resource includes a plurality of virtual disks.

11. The method of claim 1, in which the resource and client performance metrics are a function of counts of I/O operations.

12. The method of claim 1, in which the resource and client performance metrics are a function of I/O sizes.

13. The method of claim 1, in which the resource and client performance metrics are a function of I/O latency measurements.

14. The method of claim 1, in which the resource and client performance metrics are a function of I/O throughput measurements.

15. The method of claim 1, in which the resource metric is a function of a number of pending I/O requests.

16. The method of claim 1, in which the resource metric is a function of I/O throughput relative to I/O latency.

17. The method of claim 1, in which the resource metric is a function of a degree of change of the respective clients' I/O behavior.

18. The method of claim 1, further comprising identifying resource over-using clients and resource under-allocated clients relative to a resource threshold.

19. The method of claim 18, further comprising adjusting allocation of the resource among the clients to greater equalize resource usage.

20. The method of claim 18, in which the clients are virtual machines and the contended computer system resource is a plurality of virtual disks, further comprising adjusting the allocation by at least portions of at least one virtual disk to a faster tier of storage.

21. The method of claim 18, in which the clients are virtual machines and the contended computer system resource is a plurality of virtual disks, further comprising migrating at least one of the virtual machines to a different host.

22. The method of claim 18, further comprising weighting the client performance metrics per client.

23. The method of claim 18, further comprising setting different acceptable performance ranges for different clients, and for each client whose performance metric falls in its acceptable range, identifying it as neither over-using nor under-allocated.

24. The method of claim 1, in which there is a plurality of resource units, each accessed by a plurality of the clients, further comprising:
   computing, for each client, the client performance metric for each resource unit;
   for each of the selected plurality of clients, determining a relationship measure as a function of the resource performance metric and the respective client performance metric;
   filtering the relationship measures of the clients with respect to a selected sub-set of the resource units; and
   determining the degree of resource contention effect for each of the selected plurality of clients as a function of the respective selected sub-set of the relationship measures.

25. The method of claim 24, in which the resource units are separate storage devices in a distributed storage system.

26. A method for managing a contended computer system resource comprising:
measuring an aggregated resource performance metric;
for each of a selected plurality of clients, determining a client performance metric;
for each of the selected plurality of clients, determining a relationship measure as a function of the aggregated resource performance metric and the respective client performance metric;
determining a degree of resource contention effect for each of the selected plurality of clients as a function of the respective relationship measure;
identifying resource over-using clients and resource under-allocated clients relative to a resource threshold; and
taking a resource-related action according to the respective relationship measures;
in which:
the contended resource is storage;
the clients include virtual machines and the contended storage resource includes a plurality of virtual disks associated with the virtual machines;
the relationship measure is a function of correlation between the aggregated resource performance metric and each respective client performance metric;
the aggregated resource and client performance metrics are chosen from a group including:
a function of counts of I/O operations, a function of I/O sizes, a function of I/O latency measurements, a function of I/O throughput measurements, a function of a number of pending I/O requests, a function of I/O throughput relative to I/O latency, and a function of a degree of change of the respective clients' I/O behavior; and
the resource-related action is chosen from a group that includes adjusting allocation of the contended resource among the clients, throttling of access of selected ones of the clients to the contended resource; and generating a report for an administrator.

27. A system for managing a contended computer system resource comprising:
a performance analysis tool comprising computer-executable code embodied in a non-volatile medium, said code causing at least one processor
to measure an aggregated resource performance metric;
for each of a selected plurality of clients, to determine a client performance metric;
for each of the selected plurality of clients, to determine a relationship measure as a function of the aggregated resource performance metric and the respective client performance metric;
to determine a degree of resource contention effect for each of the selected plurality of clients as a function of the respective relationship measure; and
to initiate a resource-related action according to the respective relationship measures;
in which:
the relationship measure is a function of correlation between the aggregated resource performance metric and each respective client performance metric; and
the resource-related action includes adjusting allocation of the contended resource among the clients.

28. The system of claim 27, in which the clients are running on a host platform and the performance analysis tool is also running on the host platform.

29. The system of claim 27, in which the clients are running on a host platform and the performance analysis tool is provided within a separate platform and communicates with the host platform over a network.

30. The system of claim 27, further comprising a storage manager within the host, said storage manager receiving an initiation signal from the performance analysis tool and thereupon carrying out the resource-related action.

31. The system of claim 27, in which the resource-related action includes throttling of access of selected ones of the clients to the contended resource.

32. The system of claim 27, in which the resource-related action includes generating a report for an administrator.

33. The system of claim 27, in which the contended resource is storage.

34. The system of claim 33, in which the storage includes both disk storage and memory.

35. The system of claim 33, in which the clients are running on a host system and the storage includes a local storage resource that is internal within the host system.

36. The system of claim 33, in which the clients are running on a host system and the storage includes a remote storage resource accessible by the host via a network.

37. The system of claim 27, in which the clients include virtual machines and the contended computer system resource includes a plurality of virtual disks associated with the virtual machines.

38. The system of claim 27, in which the clients include virtual machines and the contended computer system resource includes a plurality of virtual disks.

39. The system of claim 27, in which the clients include user-level, host-based applications and the contended computer system resource includes a plurality of virtual disks.

40. The system of claim 27, in which the aggregated resource and client performance metrics are a function of counts of I/O operations.

41. The system of claim 27, in which the aggregated resource and client performance metrics are a function of I/O sizes.

42. The system of claim 27, in which the aggregated resource and client performance metrics are a function of I/O latency measurements.

43. The system of claim 27, in which the aggregated resource and client performance metrics are a function of I/O throughput measurements.

44. The system of claim 27, in which the aggregated resource performance metric is a function of a number of pending I/O requests.

45. The system of claim 27, in which the aggregated resource performance metric is a function of I/O throughput relative to I/O latency.

46. The system of claim 27, in which the aggregated resource performance metric is a function of a degree of change of the respective clients' I/O behavior.

47. The system of claim 27, in which the performance analysis tool further comprises computer-executable code further causing the processor to identify resource over-using clients and resource under-allocated clients relative to a resource threshold.

48. The system of claim 47, in which the performance analysis tool further comprises computer-executable code further causes the processor to adjust allocation of the resource among the clients to greater equalize resource usage.

49. The system of claim 47, in which the clients are virtual machines and the contended computer system resource is a plurality of virtual disks, in which the performance analysis tool further comprises computer-executable code further causes the processor to adjust the allocation by at least portions of at least one virtual disk to a faster tier of storage.

50. The system of claim 47, in which the clients are virtual machines and the contended computer system resource is a plurality of virtual disks, further comprising migrating at least one of the virtual machines to a different host.

51. The system of claim 47, in which the performance analysis tool further comprises computer-executable code further causes the processor to weight the client performance metrics per client.

52. The system of claim 47, in which the performance analysis tool further comprises computer-executable code further causes the processor to set different acceptable performance ranges for different clients, and for each client whose performance metric falls in its acceptable range, to identify it as neither over-using nor under-allocated.

53. The system of claim 27, in which there is a plurality of resource units, each accessed by a plurality of the clients, in which the performance analysis tool further comprises computer-executable code further causes the processor to:
    compute, for each client, the client performance metric for each resource unit;
    for each of the selected plurality of clients, to determine a relationship measure as a function of the aggregated resource performance metric and the respective client performance metric;
    to filter the relationship measures of the clients with respect to a selected sub-set of the resource units; and
    to determine the degree of resource contention effect for each of the selected plurality of clients as a function of the respective selected sub-set of the relationship measures.

54. The system of claim 53, in which there the resource units are separate storage devices in a distributed storage system.

\* \* \* \* \*